United States Patent [19]

Bedini et al.

[11] 4,408,280
[45] Oct. 4, 1983

[54] ADAPTIVE NUMERICAL CONTROL APPARATUS FOR MACHINE TOOLS

[75] Inventors: Raffaele Bedini, Pisa; Luciano Lauro, Pavone; Pier C. Pinotti, Pontremoli, all of Italy

[73] Assignee: Olivetti Controllo Numerico S.p.A., Marcianise, Italy

[21] Appl. No.: 195,087

[22] Filed: Oct. 8, 1980

[30] Foreign Application Priority Data

Oct. 11, 1979 [IT] Italy ............................. 68981 A/79

[51] Int. Cl.³ ............................................. G06F 15/46
[52] U.S. Cl. ............................... 364/474; 318/571; 364/167
[58] Field of Search ............... 364/474, 475, 167, 168; 318/571, 561, 569, 570

[56] References Cited

U.S. PATENT DOCUMENTS

| 3,819,916 | 6/1974 | Watanabe | 364/475 |
| 4,031,368 | 6/1977 | Colding et al. | 364/475 |
| 4,079,235 | 3/1978 | Froyd et al. | 364/475 |
| 4,118,771 | 10/1978 | Pomella et al. | 364/474 |
| 4,208,718 | 6/1980 | Chung | 364/474 |
| 4,237,408 | 12/1980 | Frecka | 364/475 |

FOREIGN PATENT DOCUMENTS 1398851  6/1975  United Kingdom ................ 364/475

OTHER PUBLICATIONS

Sinumerik Sprint 8T, A Manually Programmable Numerical Control for Lathes by K. R. Hoffmann, G. Richter, and J. Röhrle; from Siemens Power Engineerin I (1979), No. 11, (Nov.).
Bendix Industrial Controls Division, Dynapath N. C. with Adaptive Control; Jun. 5, 1978; Spec. Sheet.

Primary Examiner—Mark E. Nusbaum
Assistant Examiner—William G. Niessen
Attorney, Agent, or Firm—Schuyler, Banner, Birch, McKie & Beckett

[57] ABSTRACT

The system is applied to a lathe and allows control of the machine to be adapted in such manner as to make use of the maximum power of the spindle motor with the maximum feed of the tool and the minimum cutting speed. The feed rate and the cutting speed are defined by the programmer only as the permitted region within which these parameters must jointly lie. The control unit tends constantly to command the feed rate and the spindle motor in such manner as to be within this region. Then the control unit compares the power consumed by the spindle motor, which is detected by a circuit through the armature current, with the maximum power of the motor for the actual working conditions and tends to cause the feed rate and the number of revolutions to be adapted in such manner as to make use of this maximum power. The system is adapted to exclude adaptation during cutting-in-air operation.

5 Claims, 6 Drawing Figures

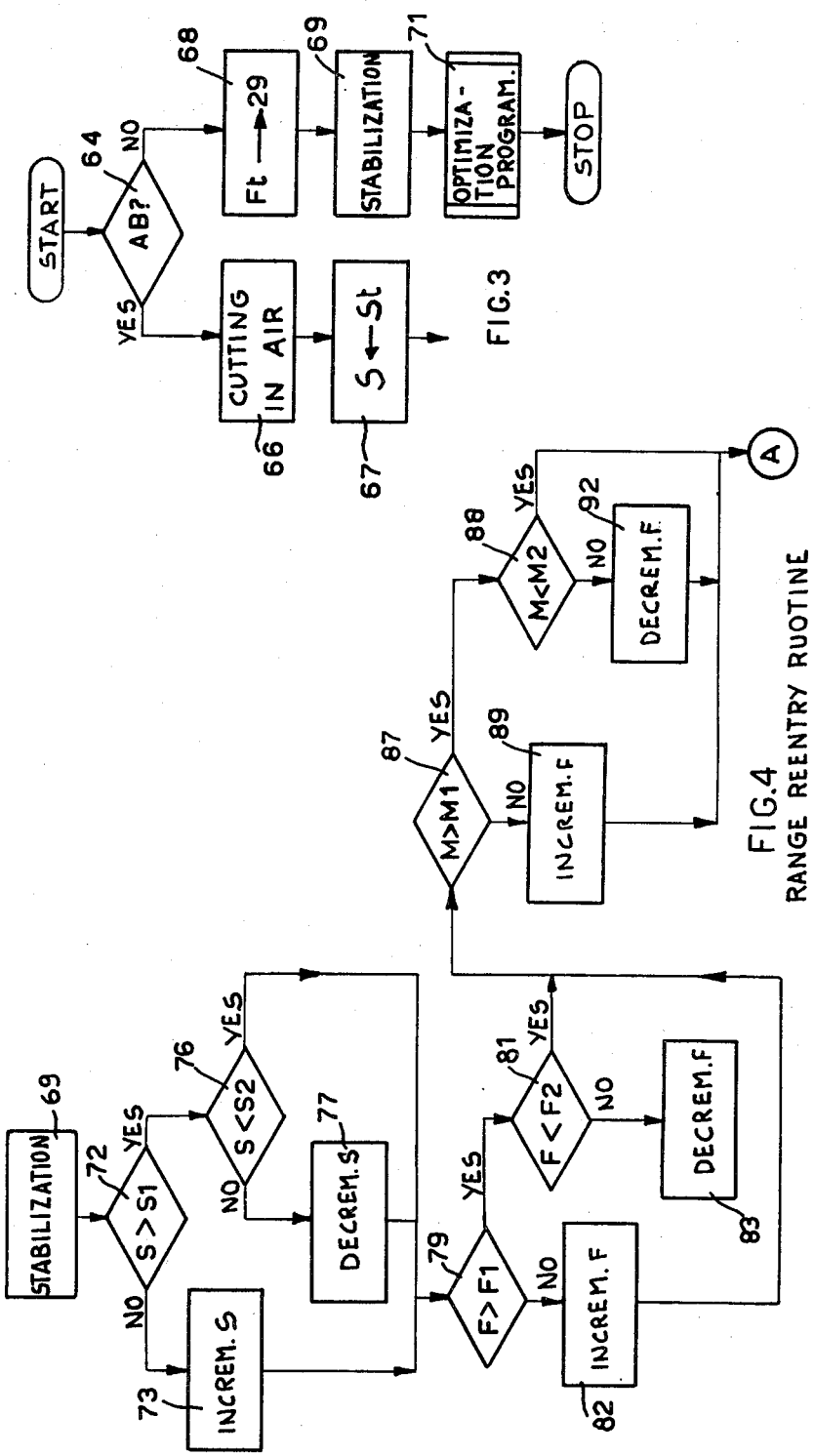

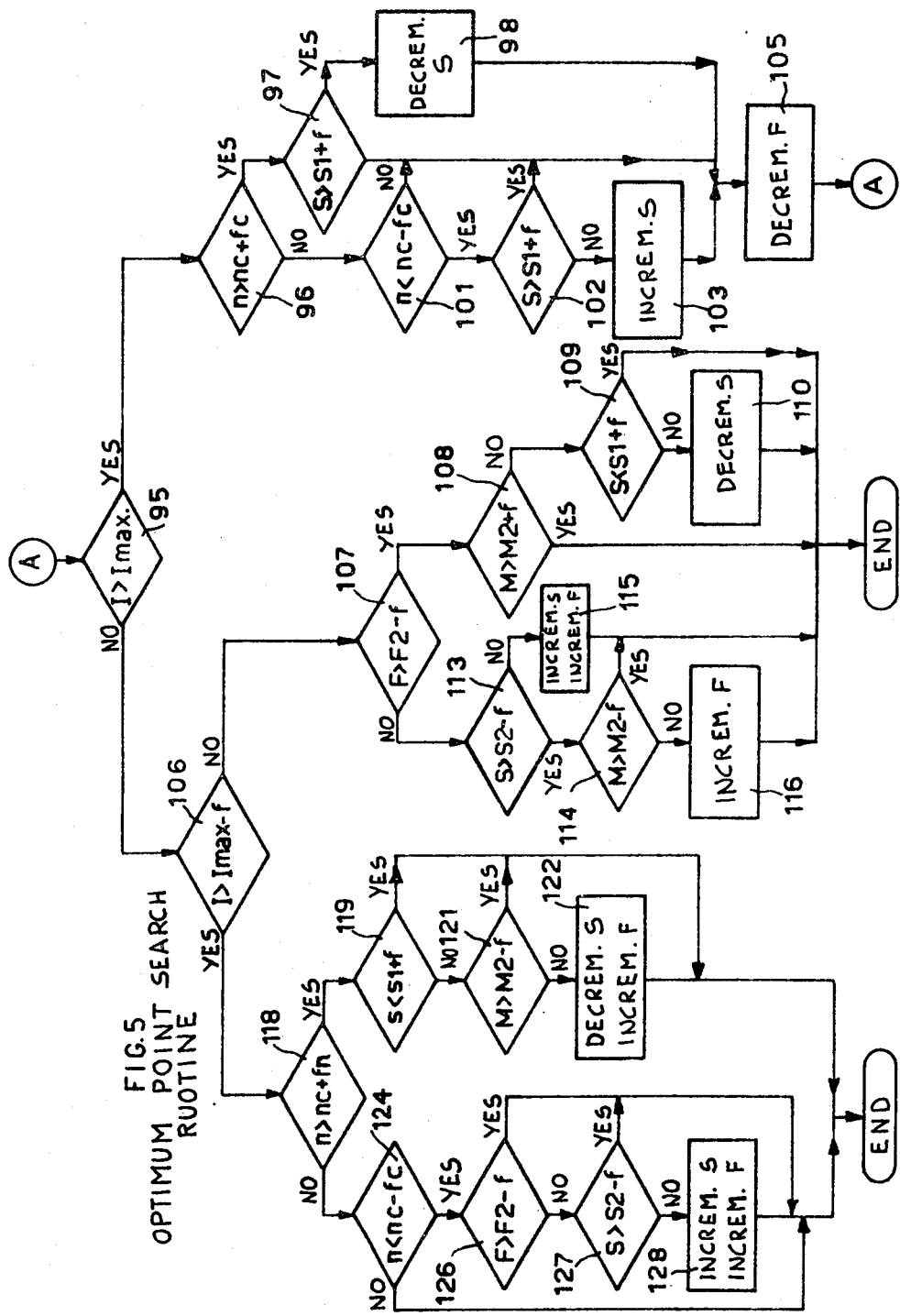
FIG.5 OPTIMUM POINT SEARCH RUOTINE

ADAPTIVE NUMERICAL CONTROL APPARATUS FOR MACHINE TOOLS

The present invention relates to an adaptive numerical control system for machine tools, comprising means for determining the relative movement between workpiece and tool, a direct-current motor which can be actuated to establish the cutting speed of a spindle, and a control unit controlled by a machining program for commanding the said means and the said motor.

In known systems of the aforesaid type, the feed data and cutting speed data are normally fixed beforehand for each operation by the programmer on the basis of the material to be machined and of the type of tool. In this way, the machine tool hardly works under optimum conditions for a maximum reduction in costs, while a previous calculation by the operator, for varying the speed on the basis of the presumable cutting effort, is almost impossible.

This drawback is obviated by the adaptive numerical control system according to the invention, which is characterised in that the said program includes data which defines a region within which the rate of the said movement and the cutting speed may vary, the system comprising sensing means adapted to sense the power means adapted to sense the power consumption of the motor in order to condition the control unit to command an operation of adaption of the rate of the movement and the cutting speed so as to optimize the machining time.

The invention will be described in more detail, by way of example, with reference to the accompanying drawings in which:

FIGS. 3 to 5 are flow diagrams of the operation of the system;

Figure 1:
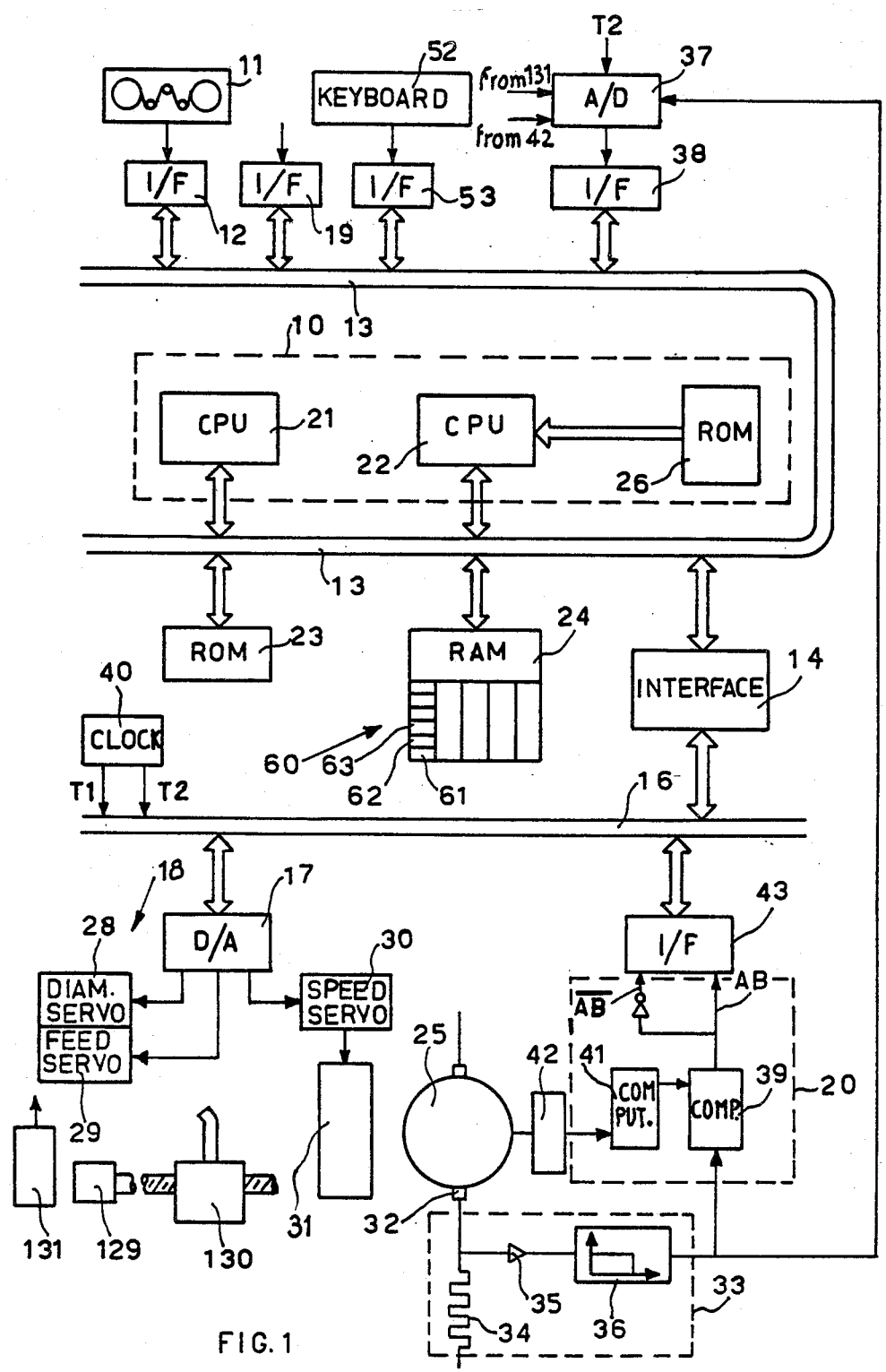
FIG. 1 is a block diagram of a numerical control system embodying the invention.

The adaptive control system comprises essentially a processing unit 10 which receives the information from a tape reader 11 through an interface 12 (I/F) and a first bus 13, the machining program being recorded on the tape. This bus is connected through an interface 14 to a second bus 16 on which the commands processed by the unit 10 arrive. Via a digital/analogue converter 17 these commands control a group of servo controls 18 for actuating the axes of the machine, that is for actuating the relative movements of the work with respect to the tool. To the bus 13 there is moreover connected an interface 19 for automatic input and output of data in parallel coming from input peripherals, for example of the type assumed to be of the magnetic recording kind.

The central processing unit 10 comprises two separate processors CPU21 and CPU22 interconnected by means of the bus 13. The two processors CPU21 and CPU22 can access a read only memory ROM 23 via the bus 13, the read only memory containing essentially the microprograms controlling the system, and a random access memory RAM24. In this there is stored from time to time the data predetermined for defining the increments of interpolation of the numerical control between two positions provided for by the program read by the tape reader 11. These increments are a function of the type of tool and of material to be machined.

The processor CPU22 is moreover controlled by a read only memory ROM 26, which contains the routine of computation and of other elementary operation of the processor CPU22. The processor CPU21 is of microprogrammed type with instructions formed by 1 to 3 bytes, for which reason it is relatively slow and is used to control the sorting of the data and the logic of the evolution of the operations and to coordinate all the functions of the peripheral units, while the processor CPU22 is also microprogrammed and uses 64-bit microinstructions, for which reason it is relatively fast and is used for operations of algebraic and trigonometric computations and of high-speed logic, substantially as described in U.S. Pat. No. 4,118,771, assigned to the same assignee.

The above-described numerical control system is applied for the control of a lathe. To this end, the group of servo controls 18 comprises a servo control 28 for defining the turning diameter and a servo control 29 for an electric motor 129 adapted to command the feed F of the tool slide 130 along the axis of the lathe. Another servo control 30 also connected to the converter 17 serves to define the speed of rotation of an electric motor 25 for actuating the workpiece spindle. To this end, the circuit 30 defines the current to be sent to an energizing circuit 31 for the spindle motor 25, while in an armature circuit 32 there is consumed a corresponding current and, therefore, a corresponding power.

The adaptive control system comprises a circuit 33 for sensing or reading the current consumed by the armature circuit 32 of the spindle motor. The circuit 33 is constituted essentially by a shunt 34 disposed in series with the armature circuit 32 and is adapted to give an electric signal proportional to the armature current. This signal is then rectified by a rectifier 35 and filtered by a low-pass circuit 36 known per se. The system moreover comprises a timing circuit 40 for generating signals T1 for timing the sampling of the converter 17, for example for a sampling frequency of 200 Hz. The circuit 40 moreover generates signals T2, for example of 3 Hz, for timing the operations of adaptation, thus defining a cycle which will hereinafter be called an optimization cycle and which is effected periodically after a predetermined whole number of samplings.

The adaptive control system moreover comprises a feed sensor constituted by the usual tachometer 131 of the feedback circuit of the numerical control. The values read by the tachometer 131 are sent to the converter 37 at each signal T2 for the adaptation operations. Another tachometer 42 is adapted to detect the number of revolutions n of the motor 25, which is communicated to the control unit 10 via the converter 37. By means of the processor CPU21, the control unit 10 is thus able to compute the cutting speed S on the basis of the characteristics of the machine and of the diameter of the workpiece, and the feed per revolution M on the basis of the feed F. This data is stored in numerical form in suitable registers of the random access memory RAM24.

Under the control of the signal T2, the output signal of the circuit 33 is sent to an analogue/digital converter 37, the numerical output information of which is sent via another parallel interface 38 to the bus 13. This information is therefore communicated to the processing unit 10. Moreover, the output signal from the circuit 33 is sent to a cutting-in-air control circuit 20 comprising a comparison circuit 39 to which a computing circuit 41 is connected. This is adapted to compute, as a function of the actual speed of the motor detected by the tachometer 42, the maximum armature current estimated for rotating the spindle when the workpiece is not engaged by the tool, that is to say when the tool encounters an air gap in the workpiece which will hereinafter be called cutting-in-air operation. The comparison circuit 39 is adapted to generate a signal AB which is high if the current consumed is less than that computed by the circuit 41, that is to say if the cutting-in-air operation is effected, while the signal $\overline{AB}$ becomes high in the condition in which cutting is performed on the material. The signals AB and $\overline{AB}$ are transmitted to the bus 16 through the medium of a further interface 43, so that the result of the comparison is also communicated to the processing unit 10. The random access memory RAM24 comprises a zone 60 provided with a series of computing registers used for the exchange of data between the processors CPU21 and CPU22 and the other units of the system. Three registers 61, 62, 63 are provided in the zone 60, these being adapted to receive and store the value of the data for commanding actuation of the servos 28 and 29 and that of the spindle motor 25, including adaptive-control corrections, as will be seen hereinafter. These corrections are computed by the processor CPU22 under the control of the interpolation programs, which are modified so as to realize these corrections. The adaptive control according to the invention has the object of obtaining the maximum reduction of machining times and the maximum length of life of the tool, whereby optimization of the machining cost is obtained.

As is known, for each tool there is a theoretical cutting condition which is considered optimum on the basis of the material. This condition is defined by a theoretical cutting speed and a theoretical feed or feed rate. By plotting the cutting speed S as abscissa and the feed F as ordinate on a cartesian graph (FIG. 2), this theoretical point is indicated by Pt and corresponds to the cutting speed St and the feed Ft.

The technological range of the machine can be defined, around the point Pt, as the range usable by the machine, on the basis of its structure, the strength of the materials, the type of tool and the material to be machined, in which the life of the tool is the maximum. The technological range is therefore defined by two vertical sides 44 and 45 which indicate the minimum cutting speed $S_1$ and the maximum cutting speed $S_2$, which are obtained by multiplying the theoretical speed St by two corresponding factors K1 and K2. The technological range is moreover defined by two horizontal sides 46 and 47 which indicate the minimum feed F1 and the maximum feed F2 of the tool, which are also obtained by multiplying the theoretical feet Ft by two corresponding factors K3 and K4. Finally, the technological range of the machine is defined by two sides M1 and M2 disposed on two straight lines passing through the origin, which indicate respectively the minimum and the maximum feed possible for the tool for each revolution of the spindle and are also computed as a function of the point Pt. More particularly, M1 and M2 are obtained by multiplying the theoretical feed per revolution Mt by two more factors K5 and K6. The value of the various factors K1 to K6 which define the technological range is given by the program on the tape unit 11.

Figure 6:
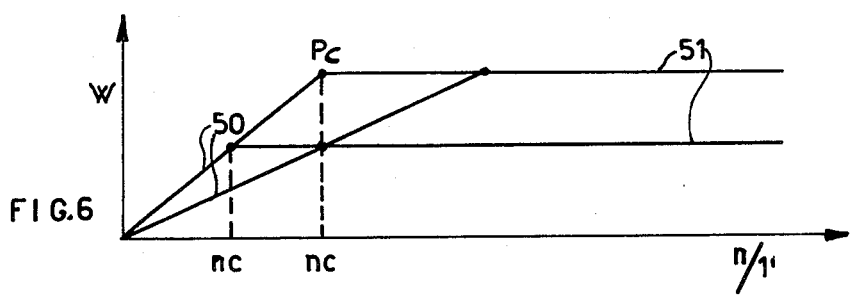
FIG. 6 is a diagram of the operation of the spindle motor.

As is known, for each running condition of the machine the motor 25 (FIG. 1) consumes a corresponding power. The feed being kept constant and the number of revolutions of the motor being indicated by n, it is known that below a predetermined number of revolutions nc, the motor 25 works at constant torque. The power consumed is then substantially proportional to the speed and is therefore represented in the cartesian graph n, W of FIG. 6 by an inclined straight line 50 passing through the origin. Above the speed corresponding to nc, on the other hand, the motor 25 works at constant power W represented by a horizontal straight line 51. The current Imax corresponding to the maximum torque and the speed nc are recorded in firmware in the read only memory ROM 26. However, as a function of the tool or the material selected, the operator can select armature current values lower than the maximum, recording the required value in percentage of the maximum current on the tape 11.

Figure 2:
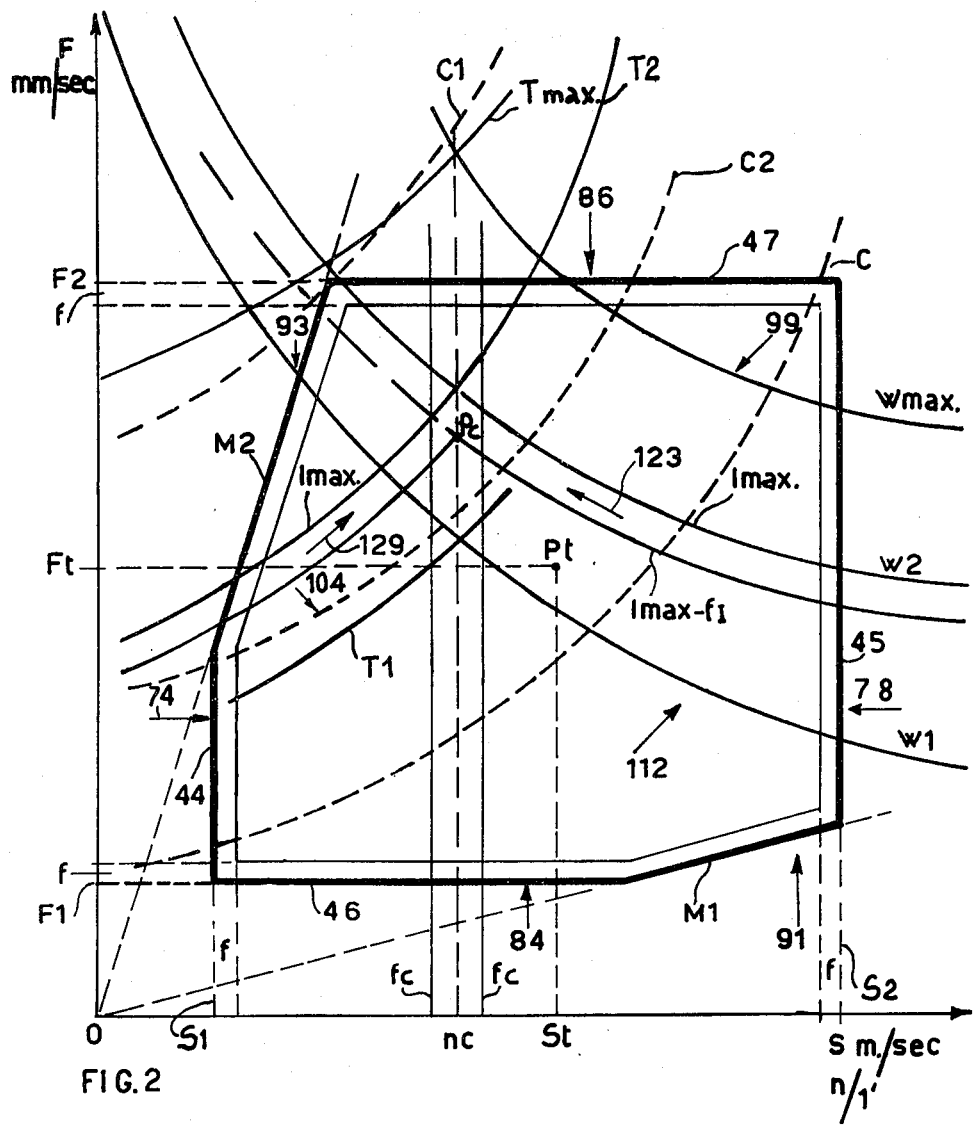
FIG. 2 is a diagram of the region in which the adaptive control acts.

By fixing a predetermined power value W, on the cutting speed S increasing, the feed F must decrease. In this way in the graph of FIG. 2 a series of curves of equal power W1, W2 . . . Wmax are shown. In the same graph are also shown a set of curves of equal torque T1, T2 . . . Tmax absorbed by the motor. The optimal point Pc for the working is the intersection of the curve of the desired optimal power with the curve of the desired optimal torque. In the case the optimal power and the optimal torque are equal to the same percentage of the maximum power Wmax and the maximum torque Tmax, which can be supplied by the motor, the number of revolution nc becomes a characteristic constant of the motor. In FIG. 2 the point Pc is the intersection of curves T2 and W2, the maximum current Imax recorded in the ROM 26, being that by the motor in the case of curves T2 and W2. Normally, the point Pc is inside the technological range as indicated in FIG. 2, so that by working at the point Pc optimization of the running conditions of the motor and a satisfactory tool life are obtained. However, this point may also be located outside this range, in dependence upon the diameter of the workpiece and other factors.

The adaptive control unit of the invention has the object of modifying the parameters which define the cutting conditions, that is to say the feed rate and the number of revolutions of the motor 25, in such manner as to tend always towards the optimum point Pc and therefore to reduce the error between this condition and the actual working condition. To this end, let it first be assumed that the point Pc is inside the technological range. At each optimization cycle, it is first established whether the effective working point is at that instant within or outside the technological range. If it is outside, a modification of the program, or adaptation, is first effected so as to bring the working point within the technological range and afterwards a series of modifications is effected such as to bring the working point towards the optimum point Pc. All these modifications are effected by incrementing or decrementing at each correction cycle the theoretical values given by the processor CPU22 for interpolation, or by the program of previously fixed increments which are recorded in the read only memory ROM 26 (FIG. 1).

More particularly, the information necessary for the operation to be effected, including the theoretical cutting conditions St, Ft and the factors K1–K6 relating to the technological range, is supplied to the control unit by means of the tape unit 11. The adaptive control is enabled through a keyboard input unit 52 and an interface 53 and is carried out through a program residing in the read only memory ROM 23. The processor CPU21 then activates the reading circuit 33, when continuously reads the current I of the armature circuit 32 of the spindle motor 25. The programming is such that at the beginning the tool does not engage the workpiece. The comparison circuit 39 therefore emits the signal AB which conditions the processor CPU22 to select a corresponding cutting-in-air routine recorded in firmware in the read only memory ROM 26. This firmware includes the fast feed rate value provided for cutting in air.

More particularly, at each optimization cycle there is now performed a test 64 (FIG. 3) on the cutting-in-air signal AB originating from the comparison circuit 39. If the result of the test is positive, the signal AB conditions the processor CPU22 to supply to the feed circuit 29 for the tool (block 66 in FIG. 3), through the buses 13 and 16, the value provided for cutting-in-air which is recorded in the read only memory ROM 26, while the command routine for carrying out cutting on the material is disabled (block 67). During the cutting-in-air the cutting speed remains the theoretical speed St.

If, on the other hand, the result of the test 64 is negative, the signal $\overline{AB}$ conditions the processor CPU22 (FIG. 1) to force into the circuit 29 the theoretical feed Ft on the material (block 68). A circuit of the processor CPU22 is then conditioned to control a multiple sensing of the means commanding the feed of the tool to check that the feed of attack is reached stably (block 69). After this, the execution of the optimization program of the cutting carried out on the material is enabled (block 71).

The cutting speed on attack of the material may be such that the working point of the lathe shown in the diagram of FIG. 2 is at any point P outside the technological range. To bring this point back within the technological range, the optimization program includes a range reentry routine, illustrated in FIG. 4. This routine begins with a test 72 to check whether the actual cutting speed is greater than the minimum speed $S_1$. In the negative case, which occurs, for example, if the lathe starts from standstill or has had a stop, the cutting speed is increased (operation 73), as a result of which the point P (FIG. 2) shifts in the direction of the arrow 74. In the positive case, another test 76 (FIG. 4) is effect to check whether this speed is less than the maximum speed $S_2$. In the negative case, the cutting speed is now reduced (operation 77), as a result of which the point P (FIG. 2) shifts in the direction of the arrow 78.

Afterwards, whether in the positive case of the test 76, which is the more frequent case, or following upon the operations 73 and 77, two tests 79 and 81 are carried out to check whether the feed F is greater than the minimum feed F1 and less than the maximum feed F2. A negative result of one of the two tests 79 and 81 causes an operation 82 or 83, respectively, to increase or reduce, respectively, the feed, as a result of which the point P shifts in the direction of the arrows 84 and 86 (FIG. 2), respectively. The operations set forth above therefore cause the point P to reenter the perimeter of the rectangle of the diagram which has S1, S2, F1, F2 as coordinates. Both after the operations 82 and 83 (FIG. 4) and in the positive case of the test 81, two further tests 87 and 88 are effected to establish whether the feed per revolution M of the spindle is greater than the minimum $M_1$ and less than the maximum $M_2$. If $M<M_1$, an operation 89 is effected and causes the feed F to increase, as a result of which the point P shifts in the direction of the arrow 91 (FIG. 2). If, on the other hand, $M>M_2$, an operation 92 is effected and causes the feed rate F to decrease (arrow 93). The operations 89 and 92 now bring the point P onto the perimeter of the technological range. If the result of the tests 76, 81 and 88 is positive, this means that the point P is located inside the technological range. The optimization program 71 (FIG. 3) includes also an optimum point search routine, which always follows the range reentry routine. The optimum point search routine starts from point A of FIG. 4 and is detailedly represented in FIG. 5. In short, therefore, the routine of FIG. 4 brings the point P onto the perimeter of the technological range if it is not already inside it, after which the routine of FIG. 5 is enabled.

For execution of this optimum point search routine, on the perimeter of the technological range (FIG. 2) there is defined a band f which indicates a tolerance zone within which the respective cutting speed and feed values are acceptable. In this way, the control is more stable and does not fluctuate continuously about the theoretical value. Similarly, another band fc is defined to the right and left of the number of revolutions nc and a band fI is defined below the maximum current Imax and therefore below the relevant power W. These bands fI and fc and the critical number of revolutions nc are recorded in firmware in the read only memory ROM 26 and are taken into consideration in the control of the processor CPU22 in the manner hereinafter described.

The optimum point search routine begins with a test 95 (FIG. 5) to establish whether the current of the armature circuit 32 of the motor 25, which current is read by the reading circuit 33, is at that instant greater than the maximum armature current Imax given by the read only memory ROM 26. In the positive case, another test 96 is carried out to establish whether the number of revolutions n of the motor 25 is greater than the number nc, increased by the band fc. If the result of the test 96 is also positive, a third test 97 is effected to establish whether the cutting speed S is greater than the minimum speed S1 increased by the band f. If this test also gives a positive result, an operation 98 is effected to reduce the cutting speed and is followed by an operation 105 for reducing the feed F, as a result of which the point P shifts in the direction of the arrow 99 (FIG. 2) until the band nc+fc and the band Imax−fI are entered in successive adaptation cycles. If, on the other hand, the result of the test 96 (FIG. 5) is negative, a test 101 is executed to establish whether the number of revolutions n of the motor 25 is smaller than the critical number of revolutions nc reduced by the band fc. In the positive case, the point P is located to the left of this band and a test 102 is effected to establish whether the cutting speed is greater than the minimum speed $S_1$ increased by the band f. If not, it is in the band of the side 44 above the curve Imax. An operation 103 is now carried out to increase the cutting speed, this being followed by the operation 105 for decreasing the feed, and the point P shifts in the direction of the arrow 104.

A negative result of the test 97 says that the point P is either on the band nc+fc or on the band of the side 44 above the current curve Imax. An operation 105 is then effected, which causes the feed F to decrease until the band of the current Imax is reached. The negative result of the test 101 says that the point P is in the band nc+fc above the curve of the current Imax. In this case, the operation 105 is effected in order to reduce the feed F, shifting the point P downwardly in the band nc±fc. A positive result of the test 102 means that the point P is inside the technological range to the left of the band of nc and above the curve of the current Imax. Also in this case the operation 105 is effected to reduce the feed rate F. In the foregoing three cases, the reduction continues in successive adaptation cycles until the point P reachs the band Imax−fI.

If the test 95 gives a negative result and, therefore, also when this condition occurs owing to the effect of the operation 105, a test 106 is carried out to establish whether the armature current I is contained in the band of the curve of the current Imax (I>Imax−fI). In the negative case, a test 107 is made to establish whether the feed F is in the band of the side 47 (FIG. 2) of the technological range. If so, another test 108 establishes whether the feed per revolution M is in the band of the side M2. If the result of this test is positive, it means that the point P is in the vertex of the bands of the sides 47 and M2 and the band of the current Imax cannot be reached and the routine ends. In this case, the optimization is satisfactory from the point of view of machining cost. In fact, in the diagram of FIG. 2 there are given the curves C1, C2, C3 of the constant-cost conditions on variation of the values of S and F. The costs increase from C1 to C3. It can be seen that the vertex 47-M2 is on the curve C1 of minimum cost.

If, on the other hand, the result of the test 108 is negative, another test 109 is carried out to establish whether the cutting speed S is in the band of the side 44. If the result of this test is positive, it means that the maximum feed per revolution M2 is outside the two sides 44 and 47 or passes through the vertex of these two sides. The point P is in this vertex and the routine ends as in the preceding case. Finally, if the result of the test 109 is negative, it means that the point P is inside the technological range. An operation 110 is then commanded for decreasing the cutting speed S. The point P thus tends to be brought towards the left on the band F2-f to reach the vertex 47-M2, being brought into the conditions of the preceding cases.

In the case in which the test 107 gives a negative result, that is if the point P is below the band of the side 47, another test 113 establishes whether the cutting speed is on the band of the side 45. In the negative case, this means that the point P is in the technological range or on the bands of the sides 44, 46 or M1. An operation 115 is now effected by means of which the cutting speed S is incremented and the feed F is incremented. The point P therefore shifts in the direction of the arrow 112 towards the band of the current Imax. In the positive case, on the other hand, another test 114 is effected to establish whether the speed per revolution M is on the band of the side M2. If this test gives a positive result, it means that the side M2 intersects the side 45. The point P is in the vertex of these two bands and the curve of the current Imax cannot be reached. Optimization, however, has taken place at the point of minimum cost and the routine ends. If the test 114, finally, gives a negative result, an operation 116 is carried out which causes the feed F to be incremented, which tends to bring the point P towards the band Imax. If, on the other hand, the result of the test 106 is positive, it means that the point P is in the band Imax−fI. A test 118 is then carried out to establish whether the number of revolutions n is greater than the relevant number of revolutions nc+the band fc. If so, another test 119 establishes whether the cutting speed is in the band of the side 44. In the negative case, another test 121 is performed to establish whether the feed per revolution M is in the band of the side M2. If a negative result is also obtained now, this means that the point P is inside the technological range or on the bands of the sides 45, 46 or M1. An operation 122 is effected to reduce the cutting speed and increase the feed in the direction of the arrow 123, until the point P is brought into the zone of the optimal point Pc. If the result of the test 119 or 121 is positive, the point P is on the band of the side 44 or of the side M2, while the point Pc and, therefore, the band nc+fc are to the left. In these cases, the point P is already in the position of optimization and the routine ends. Finally, if the result of the test 118 is negative, another test 124 is carried to establish whether n<nc−fc. In the positive case, this means that the point P is in the band Imax−fI, but to the left of the band nc−fc. Another test 126 now establishes whether the feed F is in the band of the side 47. If not, a further test 127 establishes whether the cutting speed S is in the band of the side 45. If this test also gives a negative result, this means that the point P is inside the technological range or on the bands of the sides 44, 46 or M1. An operation 128 is carried out to increase the cutting speed and increase the feed in the direction of the arrow 129, until the point P is brought into the zone of the point Pc.

In the case of a positive result of the test 127, this means that the bond nc−fc is on the right of the side 45. Since the point P is in the band of the current Imax, optimization has been achieved and the routine ends. Similarly, if a positive result is obtained for the test 126, the point Pc is above the side 47, so that optimization has been achieved and the routine ends. Finally, if the test 124 gives a negative result, the point P is already both in the band nc−fc and in the band of the current Imax and is therefore in the zone of Pc, whatever its position within the technological range or in the lateral bands thereof, so that optimization has been achieved and the routine ends.

To sum up, the routine of FIG. 4 brings the point P onto the perimeter of the technological range, if the point P is outside. The routine of FIG. 5 causes the point P to shift so as to tend towards the vertex of the sides 47 and M2 if the band of the current Imax is above the technological range or towards the zone of the point Pc if this band is inside the range, as in FIG. 2.

If the point Pc is outside the technological range, but the band of the current Imax intersects the technological range, the point P is brought onto that intersection of this band with the perimeter of the technological range which is closer to the vertex of the sides 47 and M2. It is therefore clear that in every case the control unit is conditioned to control the means for moving the tool for the feed and the speed of the motor 25 so as to reduce the error between the optimum condition and the actual condition sensed by the sensing means 131 and 33. Even in the case in which Pc is outside the technological range, the adaptation of the feed and of the cutting speed is effected towards the optimum point from the point of view of the cost of the operation, which represents the optimum condition possible on the basis of the technological range and the characteristics of the motor.

It is understood that various modifications and improvements can be made in the system described without departing from the scope of the invention. For example, it can be applied to machine tools having a rotating tool spindle, such as milling or drilling machines, in which the motor 25 is used to rotate the spindle, while the circuit 18 is used for controlling the axis or axes of the machine defining the feed.

We claim:

1. An adaptive numerical control system for a lathe, comprising a cutting tool having optimum cutting conditions when cutting at a predetermined cutting speed and at a predetermined feed rate, a direct-current electric motor operable for rotating a workpiece spindle at a number of revolutions per-unit-time corresponding to an actual cutting speed, said motor having an armature circuit absorbing an electric current proportional to power supplied by the motor, said motor having a predetermined characteristic revolution number defining the optimum working conditions for the motor when the motor operates at the maximum torque and at the maximum power corresponding to a maximum current that said armature circuit can absorb, moving means for moving said tool at the actual feed rate with respect to the workpiece spindle, memory means for storing a machining program, a control unit for executing the machining program stored in said memory means to command said moving means and said motor, recording means for recording a machine technological range around said optimum cutting conditions, said range being defined by maximum and minimum feed rate of said tool, maximum and minimum number of revolutions per-unit-time of said motor and maximum and minimum feed per revolution, said range including said optimum working conditions, said recording means also recording said maximum current and said characteristic revolution number, means for sensing said moving means to indicate the actual feed rate, a tachometer for indicating the number of revolutions per-unit-time of said motor, a shunt arranged in series with said armature circuit, shunt sensing means for sensing said shunt to indicate the current flowing in said armature circuit, timing means for defining an optimization cycle, comparison means controlled by said timing means for cyclically effecting a comparison of the actual feed rate indicated by said means for sensing the moving means and the number of revolutions per-unit-time indicated by said tachometer with said range to condition said control unit to command an operation of said moving means and of said motor to first bring the actual feed rate and number of revolutions per-unit-time within said range, said comparison means being effective when said actual feed rate and number of revolutions per-unit-time are within said range for effecting a comparison of the current indicated by said shunt sensing means and the number of revolutions per-unit-time indicated by said tachometer with said recorded maximum current and characteristic number of revolutions respectively to condition said control unit to command an operation of said moving means and said motor to bring said actual feed rate and said number of revolutions per-unit-time toward said optimum working conditions.

2. A system as claimed in claim 1, comprising computing means controlled by the control unit for computing the current of said armature circuit corresponding to the power needed by the motor for carrying out cutting-in-air operation, said comparison means being arranged to compare the current sensed by the sensing means and that given by the computing means for excluding the operation of adaptation until such time as the current sensed exceeds the computed current.

3. A system as claimed in claim 1, wherein the said range recording means comprise first means controlled on the basis of the tool characteristics, for defining a band around the limits of the said range, and said means for recording the maximum current include second means controlld on the basis of a predetermined power and torque data of the motor, for defining a band along the maximum current and around the characteristic revolution number of the motor to define an optimum working condition.

4. A system as claimed in claim 3, wherein the comparison means cyclically effect a series of comparisons with the data of the said first and second means for acting on the moving means and on the motor in such manner as first to bring the feedrate and the speed onto the band around the said limits and then to bring them, along the said band, onto the band along said maximum current or around said characteristic revolution number.

5. A system as claimed in claim 4, wherein the comparison means finally condition the moving means and the motor to shift the feedrate and the cutting speed along the band of the said maximum current toward said optimum working conditions for the motor.

* * * * *